United States Patent [19]

Floyd et al.

[11] 4,286,513
[45] Sep. 1, 1981

[54] TAGGING APPARATUS FOR HAY BALER

[76] Inventors: Don Floyd, 4658 El Penon Way, San Diego, Calif. 92117; Lee M. Whittle, 396 W. Keystone Rd., Brawley, Calif. 92227; Richard R. Ramey, 1409 Farneworth Rd., El Centro, Calif. 92243

[21] Appl. No.: 172,001

[22] Filed: Jul. 24, 1980

[51] Int. Cl.³ ............................................... B30B 15/00
[52] U.S. Cl. ..................................... 100/102; 40/305; 53/50; 226/67
[58] Field of Search ................... 100/102, 44; 226/62, 226/67; 53/50; 141/98; 40/305

[56] References Cited

U.S. PATENT DOCUMENTS 1,303,278  5/1919  Field ............................... 226/62 X
3,197,104  7/1965  Brethen ............................ 226/67
3,232,215  2/1966  Agle .............................. 100/102 X
3,890,891  6/1975  Floyd .............................. 100/102

Primary Examiner—Billy J. Wilhite
Attorney, Agent, or Firm—Brown & Martin

[57] ABSTRACT

A tagging attachment for a hay baler for automatically inserting an identification tag into a hay bale at a specified preselected location, includes a guide support member extending into the bale chamber for supporting a tag in a position in the chamber for being torn from a roll or strip of tags as the bale is being formed. The hay passing across the support engages and tears the tag from the tag strip. Tags are selectively and intermittently advanced in response to a predetermined timing during the formation of the bale for precise location of the tag within the bale.

10 Claims, 7 Drawing Figures

TAGGING APPARATUS FOR HAY BALER

BACKGROUND OF THE INVENTION

The present invention relates to baling apparatus and pertains particularily to an apparatus for inserting a tag into a bale.

The tagging of bales of hay and the like to indicate the source and to identify the producer of the hay has come into use in some parts of the country today. Such tagging has been found to be desirable not only to indicate the source of the hay to insure quality but also to identify the source or owner of the hay in case of theft or the like. While the present invention is described and designed primarily for the marking of bales of hay, the system and concept can be utilized for the tagging and identification of any baled medium such as cotton, waste paper, and other waste products or refuse.

While an external marking or tagging of bales or the like is a simple matter such tagging is frequently ineffective especially where theft has occurred. Such external tags can be easily and quickly removed, or replaced without leaving any indication of the source or identified location of the product.

For this reason internal tagging wherein a tag is inserted at a predetermined position in the bale has become a popular technique for tagging or identification of bales. It is desirable that the tag be inserted at a selectable predetermined location in the bale which may vary from producer to producer.

While many mechanisms and apparatus have been proposed in the past for tagging and inserting a tag into bales of hay and the like such mechanisms have been unsatisfactory. One of the major drawbacks to such prior art apparatus or devices is the unreliability thereof.

For this reason it is desirable that some bale tagging apparatus be available which is simple and inexpensive to manufacture and yet effective and reliable in the tagging of bales.

SUMMARY OBJECTS OF THE INVENTION

It is therefore the primary object of the invention to overcome the above problems of the prior art.

Another object of the invention is to provide a simple, rugged and inexpensive bale tagging attachment for a standard baler.

A further object of the invention is to provide a simple, rugged and effective bale tagging apparatus for attachment to a baling apparatus or machine.

In accordance with the primary aspect of the present invention the tagging apparatus include a support and guide extending into a baling chamber with means for selectively inserting a tag into the stream of bale forming materials for being torn from the tag strip upon movement of the hay or baled material across the face of the guide member.

BRIEF DESCRIPTION OF THE DRAWINGS

The above and other objects of the invention will become apparent from the following description when read in conjunction with the drawings wherein.

DETAILED DESCRIPTION OF THE PREFERRED EMBODIMENT

Figure 1:
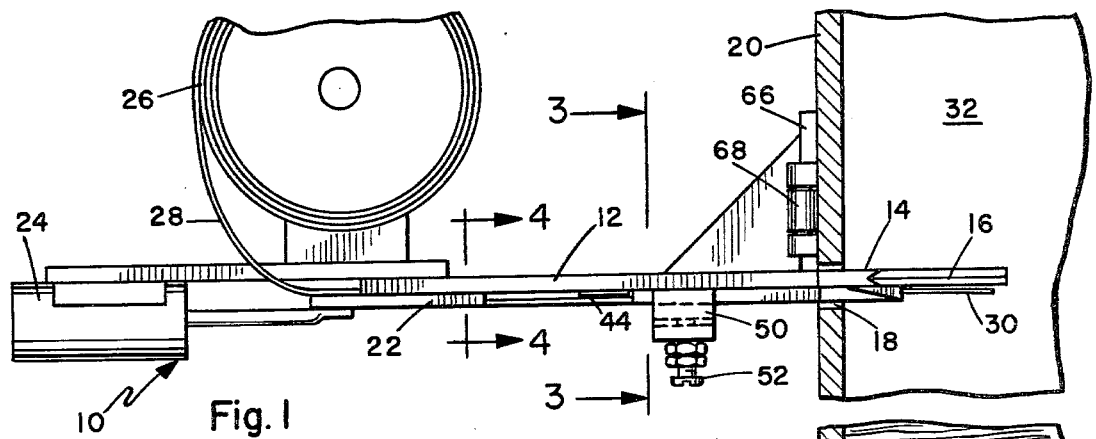
FIG. 1 is a front elevational view showing the attachment in position in a baler.

Turning to FIG. 1 of the drawings there is illustrated an apparatus designated generally by the numeral 10 for inserting a tag or label into a bale of hay or the like. The apparatus includes a support and bracket member 12 of a generally flat rectangular configuration having a forward end formed of or to which is attached a somewhat triangular blade configuration 14 having a belved edge 16 facing into the path of hay or other bale materials. The forward end 14 extends through a slot 18 in a baler chamber wall or housing wall 20 into the bale chamber.

A guiding and feeding mechanism includes a reciprocating slide member 22 which reciprocally mounted on the underside of the support member 12 and is reciprocated by means of a fluid actuated ram 24. Other forms of actuation including a solenoid or the like can be utilized. The feeding or slider mechanism 22 engages and advances individual tags or a strip of tags from a roll 26 mounted on the feeding mechanism, with a strip of tickets 28 extending into a slot 40 beneath the support member 12 and is dispensed outward from a slot with individual tickets 30 extending outward inside the bale chamber 32 in the path of bale material. The individual ticket or tag extends outward onto the or beneath the blade 14 and is engaged and stripped or torn from the roll by means of the advancing bale material 34.

The general configuration and operation of the typical hay baler is illustrated and described in U.S. Pat. No. 3,890,891 the disclosure of which is fully incorporated herein by reference. As pointed out therein the conventional formation of a bale of hay or the like is formed by a ram in the bale forming chamber in layers by ramming layers of materials intermittingly fed thereinto. The bales are tied at particular lengths by a tying mechanism which on modern machines includes one or more needles that are forced through the bale. In the present invention it is contemplated that the tag is to be selectively inserted anywhere along the length of the bale depending on the particular producer or the like. This forms a code indicating the location of the tag.

The activation of the slider and thus the dispensing of each selected tag can be controlled by an activating mechanism which is responsive to either the tying mechanism of the baler or any other mechanism indicating the beginning of a bale of hay. The activation can then be timed such that the tag is inserted in or dispensed into the chamber after the ram had withdrawn from a compressive stroke in preparation for receiving a charge of material to be baled.

Figures 6, 7:
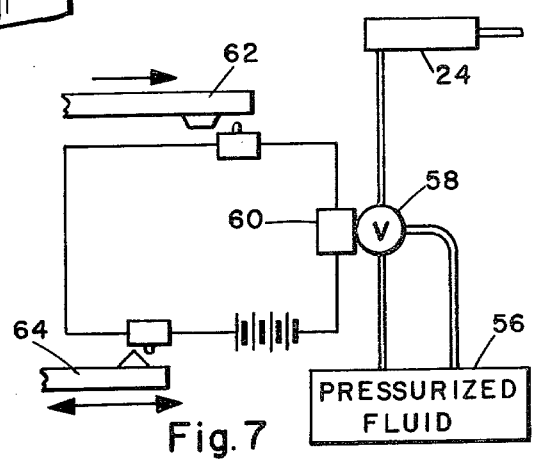
FIG. 6 is a top plan view of a strip of tickets or tags for use in the apparatus.
FIG. 7 is a diagram of the actuating system.

The construction as contemplated herein eliminates the need for knives or the like for cutting the tags from the roll. Preferably the roll is perforated to separate individual tags as illustrated in FIG. 6. With this arrangement each individual tag can be torn from the end of the roll by means of the advancing charge of baled material.

The tag 30 is thus wiped or torn from the end of the roll simply by the advancing charge of hay or the like.

Figure 2:
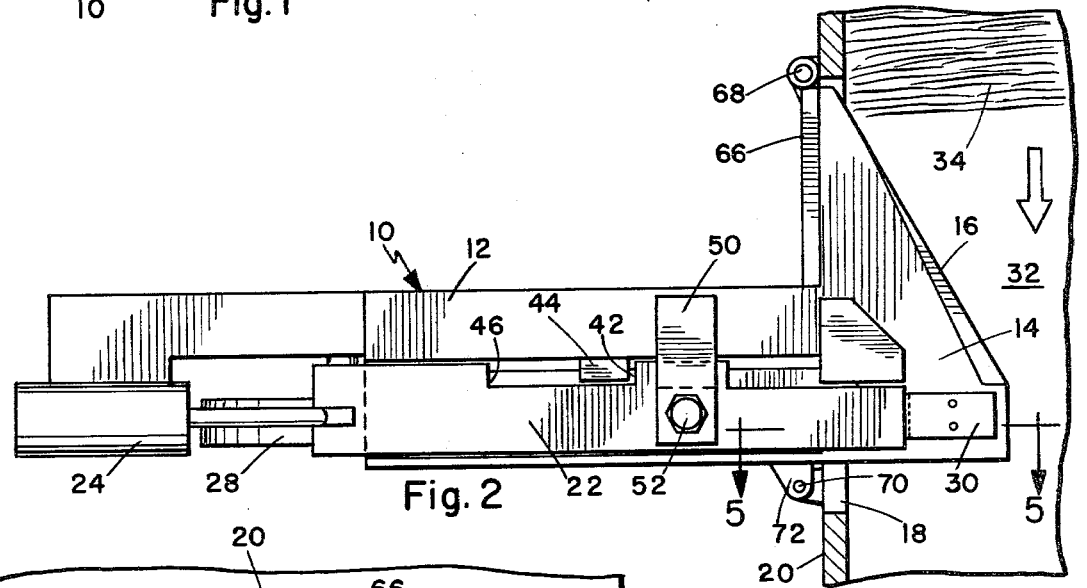
FIG. 2 is a bottom plan view of the structure of FIG. 1.
Figure 3:
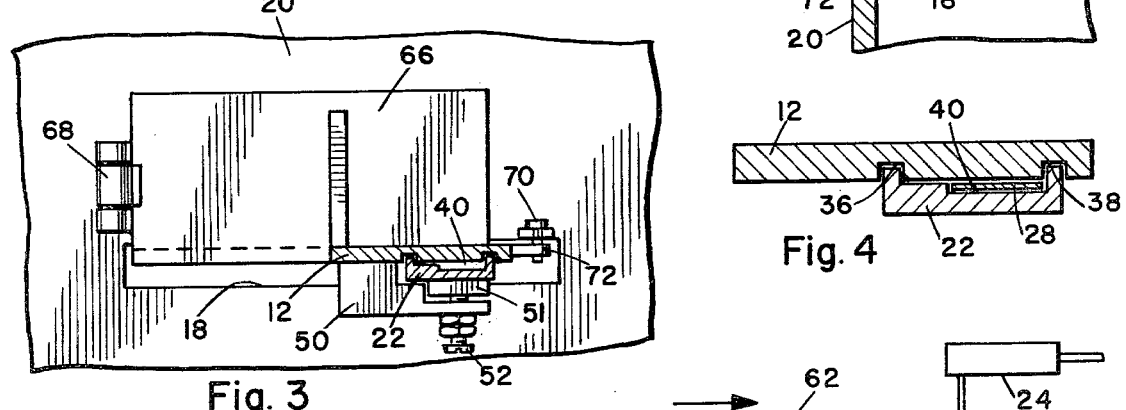
FIG. 3 is a sectional view taken on line 3—3 of FIG. 1.
Figure 4:
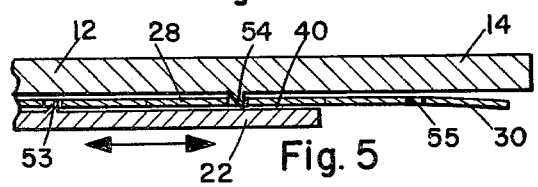
FIG. 4 is an enlarged view taken on line 4—4 of FIG. 1.

The preferred construction of a guide way or slot for the ticket strip 28 is best shown in FIG. 4. In the preferred construction the slide member 22 is formed in a generally U-shaped configuration as illustrated and rests in grooves formed at 36 and 38 in the face support member 12. This arrangement provides a generally rectangular cross section slot 40 through which the tags are fed. The slide member 22 as best seen in FIG. 2 includes a shoulder 42 adapted to engage one side of a stop member 44 and a shoulder at 46 adapted to engage the other side of stop 44. This limits the stroke of the slide member 22. Preferably adjustable stops means may be provided so that the stroke of the slide member 22 may be adjusted to the length of the ticket or tag being dispensed. A bracket or arm 50 extends beneath the slide member 22 and has a shoe 51 which supports the slide member and is adjustable by means of screw 52 into the proper spacing engagement or spacing from the guide member 12 as in FIG. 3. This adjusts the spacing between the members and thus the guide slot 40 for the passage of the tickets.

Figure 5:
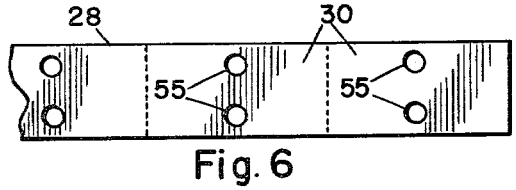
FIG. 5 is an enlarged sectional view taken on line 5—5 of FIG. 2.

The slide and the support members preferably include pawls 53 and 54 as shown best in FIG. 5 which alternately engage perforations within the strip 28 of tickets for advancing and holding the tickets in a predetermined position. This pawl mechanism for advancing and for engaging and holding the tickets in the advanced positions may either engage individual perforations especially placed on the tags for this purpose. As best seen in FIG. 6 perforations 55 may be selectively placed in each tag 30 for engagement by the respective pawl members.

The unit is stabilized against wall 20 by a face plate 66 fixed perpendicularly to support member 12. The forward end of face plate 66 is attached to wall 20 by a hinge 68 and the rear end is secured by a shear pin 70 through a bracket 72. If any obstruction or solid matter in the baler is driven against blade 14 with sufficient force to cause damage, the shear pin 70 will break and allow the blade to swing outwardly.

Turning to FIG. 7 there is illustrated a schematic of a control system for activation of the tag feeding mechanism. This control mechanism includes a source of pressurized fluid such as hydraulic or a gas supplied from a source 56 through means of a control valve 58 which may be controlled, for example, by a solenoid 60 supplying fluid to the ram 24. The ram may be either single or double acting and in the case of a single acting or action would be spring returned. The solenoid 60 would be actuated by means of a electrical circuit as illustrated which would be preferably controlled by some sequence of the bale length indicating means such as the tying or threading mechanism 62 and the ram advancing or activating system 64. Thus the feeding mechanism can be thus selectively activated at a particular length of the bale. Thus upon retraction of the ram at a time when the length of the bale has advanced to its position to activate the bale length switch the ram switch will be similarily activated completing the circuit to activate the ram 24. A ticket will then be advanced into the bale chamber and thus into the formed bale.

While I have illustrated and described my invention by means of specific embodiments, it is to be understood that numerous changes and modifications may be made therein without departing from the spirit and scope of the invention as defined in the appended claims.

Having described our invention, we now claim:

1. A tagging attachment for a baler having a chamber through which materials are formed into a bale, the attachment comprising:

a support member for projecting through the wall of a baler into the baler chamber and having substantially planar support surface parallel to the direction of movement of the bale through the chamber;

guide means for guiding a tag onto said support surface; and feeding means for selectively feeding tags onto said surface for passage with bale material into a bale.

2. The tagging attachment of claim 1 wherein said feeding means comprise a slide member mounted for reciprocal movement on said support member, means on said slide member for engaging and advancing a tag upon movement toward said support surface, and power means for reciprocating said slide.

3. The tagging attachment of claim 2 including means responsive to a pre-determined advancement of a bale in said chamber for activating said power means.

4. The tagging attachment of claim 2 wherein said guide means comprises a slot formed between said support member and said slide member.

5. The tagging attachment of claim 4 wherein said slide has a generally U-shaped cross sectional configuration defining said slot.

6. The tagging attachment of claim 5 wherein said support member includes a pair of spaced apart grooves for guideing engagement with said slide member.

7. The tagging attachment of claim 6 wherein said slide member includes pawl means for engaging and advancing a tag with movement of said slide.

8. The tagging attachment of claim 7 wherein said guide member includes pawl means for engaging and retaining a tag in an advanced position during return stroke of said slide member.

9. The tagging attachment of claim 1 wherein said support member includes a generally wedge shape blade at the forward end thereof for projecting into the bale chamber.

10. The tagging attachment of claim 9 wherein said support member includes pivot means for pivotally mounting said support member to the wall of a baler; and shear pin means for normally retaining said blade of said support member in the baler chamber.

* * * * *